United States Patent
Tihen et al.

(10) Patent No.: US 11,291,871 B2
(45) Date of Patent: Apr. 5, 2022

(54) AUTOMATIC NITROGEN FILL FOR A FIRE SPRINKLER SYSTEM

(71) Applicant: Potter Electric Signal Company, LLC, Hazelwood, MO (US)

(72) Inventors: Joshua Tihen, St. Louis, MO (US); Timothy Decker, Florissant, MO (US)

(73) Assignee: Potter Electric Signal Company, LLC, Hazelwood, MO (US)

( * ) Notice: Subject to any disclaimer, the term of this patent is extended or adjusted under 35 U.S.C. 154(b) by 228 days.

(21) Appl. No.: 15/884,049

(22) Filed: Jan. 30, 2018

(65) Prior Publication Data

US 2018/0214725 A1 Aug. 2, 2018

Related U.S. Application Data (60) Provisional application No. 62/452,113, filed on Jan. 30, 2017.

(51) Int. Cl.
*A62C 35/68* (2006.01)
*G05D 7/06* (2006.01)
(Continued)

(52) U.S. Cl.
CPC .............. *A62C 35/68* (2013.01); *A62C 35/60* (2013.01); *A62C 35/645* (2013.01); *A62C 37/50* (2013.01);
(Continued)

(58) Field of Classification Search
CPC ..... A62C 35/645; A62C 37/50; A62C 35/023; A62C 35/026; A62C 99/0018; A62C 13/68; A62C 35/00–68; B01D 53/30; B01D 69/08; B01D 53/22; B01D 63/02; B01D 2053/224; B01D 2256/10; F17C 13/00; G05D 7/0635
(Continued)

(56) References Cited

U.S. PATENT DOCUMENTS 5,438,841 A 8/1995 Cahill-O'Brien et al.
6,102,066 A 8/2000 Craig et al.
(Continued)

FOREIGN PATENT DOCUMENTS

WO 2015134914 A1 9/2015

OTHER PUBLICATIONS

Viking Corp., "Technical Data: Dry Pipe Sprinkler System," Mar. 2, 2007 (6 pages).
(Continued)

*Primary Examiner* — Darren W Gorman
*Assistant Examiner* — Juan C Barrera
(74) *Attorney, Agent, or Firm* — Lewis Rice LLC (57) ABSTRACT

A gas supply system primarily designed for use with fire sprinkler systems which includes a control system which uses flow demand to automatically determine the mode of operation and switch between providing air and nitrogen. The gas supply system can operate either in standard nitrogen generation mode where nitrogen is supplied to the reservoir tank and/or sprinkler system or in a bypass mode, where sufficient pressure is only obtained by directly supplying air. The gas supply system can provide for improved safety in operation as well as the ability to operate the sprinkler system primarily when filled with nitrogen supervisory gas.

20 Claims, 1 Drawing Sheet

(51) Int. Cl.
*B01D 53/30* (2006.01)
*B01D 69/08* (2006.01)
*A62C 35/60* (2006.01)
*A62C 35/64* (2006.01)
*A62C 37/50* (2006.01)
*F17C 13/00* (2006.01)
*A62C 35/62* (2006.01)
*B01D 53/22* (2006.01)
*B01D 63/02* (2006.01)

(52) U.S. Cl.
CPC ............ *B01D 53/30* (2013.01); *B01D 69/08* (2013.01); *F17C 13/00* (2013.01); *G05D 7/0635* (2013.01); *A62C 35/62* (2013.01); *B01D 53/22* (2013.01); *B01D 63/02* (2013.01); *B01D 2053/224* (2013.01); *B01D 2256/10* (2013.01)

(58) Field of Classification Search
USPC .......................................................... 169/16
See application file for complete search history.

(56) References Cited

U.S. PATENT DOCUMENTS

| | | | |
|---|---|---|---|
| 6,540,028 B2 | 4/2003 | Wood | |
| 7,594,545 B2* | 9/2009 | Love | A62C 35/00 |
| | | | 169/11 |
| 7,717,776 B2 | 5/2010 | Wagner et al. | |
| 9,144,700 B2 | 9/2015 | Burkhart et al. | |
| 9,186,533 B2 | 11/2015 | Kochelek et al. | |
| 9,717,935 B2 | 8/2017 | Kochelek | |
| 2006/0021759 A1 | 2/2006 | Golinveaux | |
| 2010/0065287 A1* | 3/2010 | Burkhart | A62C 35/58 |
| | | | 169/17 |
| 2010/0263882 A1* | 10/2010 | Bodemann | F16K 15/04 |
| | | | 169/17 |
| 2013/0168109 A1* | 7/2013 | Kochelek | A62C 35/645 |
| | | | 169/17 |
| 2015/0014000 A1 | 1/2015 | Kochelek | |
| 2016/0008644 A1 | 1/2016 | Kochelek et al. | |
| 2016/0329114 A1 | 11/2016 | Lin-Hendel | |

OTHER PUBLICATIONS

National Fire Protection Association ("NFPA") "Standard for the Installation of Sprinkler Systems," 2007 Edition (408 pages).
"Plant Layup and Equipment Preservation Sourcebook," Interim Report, Mar. 1987, prepared by Multiple Dynamics Corporation for the Electric Power Research Institute ("EPRI") (196 pages).
Flowe, Mike, "The Energy Costs Associated with Nitrogen Specifications," Compressed Air Best Practices, http://www.airbestpractices.com/system-assessments/air-treatmentn2/, printed on Dec. 27, 2016, (6 pages).
International Search Report, International Patent Application No. PCT/US2018/016027, dated Apr. 27, 2018 (16 pages).

* cited by examiner

AUTOMATIC NITROGEN FILL FOR A FIRE SPRINKLER SYSTEM

CROSS REFERENCE TO RELATED APPLICATION(S)

This application claims the benefit of U.S. Provisional Patent Application 62/452,113, filed Jan. 30, 2017, the entire disclosure of which is herein incorporated by reference.

BACKGROUND

1. Field of the Invention

The present invention generally relates to corrosion inhibiting systems for fire sprinklers. Particularly to systems which can provide nitrogen or air to a dry pipe fire sprinkler system automatically depending on requirements of the sprinkler system.

2. Description of the Related Art

Piping and other metal systems in contact with water, air, or other chemicals are often subject to chemical corrosion where the metals' contact with the substance can cause a reaction altering the chemical structure of the metal. The most well known type of chemical corrosion of metal is rust, or the oxidation of iron. Oxygen gas corrosion is present generally wherever metallic composites are exposed to atmospheric or oxygen laden water conditions.

In addition to chemical corrosion, corrosion can also be caused by microbial growth on the metal which is often referred to as MIC (Microbiologically Influenced Corrosion). MIC is most commonly problematic in piping systems and occurs in a variety of industrial and other venues such as, but not limited to, fire protection sprinkler pipeline systems, water treatment facilities, cooling towers, oil and gas pipelines and production equipment, nuclear power plants, ocean and river shipping vessels, or in other places where microbes are generally introduced to the system via water contact.

Because corrosion can cause structural failure of metallic systems, a number of systems and methods have been proposed to try and reduce or eliminate corrosion in a variety of circumstances. In piping systems treatment of the internal surface of the pipe, which is often not readily accessible once the system is installed, can be difficult. This can be particularly true in generally sealed piping systems such as wet pipe fire protection systems which are often filled with stagnant, relatively inaccessible water where access requires the significant expense of draining and refilling the system.

To try and resolve such concerns, a number of materials and methods for piping systems to resist corrosion have been developed. Since corrosion generally requires either the presence of microbes (which usually are carried in water), or the presence of water and oxygen, one of the most common ways to try and reduce corrosion is to eliminate standing water within a fire suppression system. The most common way to do this currently is to utilize what is commonly called a dry pipe or pre-action pipe system.

In dry and pre-action pipe systems, the pipes in the sprinkler system are not filled with water but are filled with pressurized gas. The pressure of the gas in the sprinkler system serves to hold down a clapper valve on the dry pipe which in turn holds back the water which may be in a pressurized municipal system or some form of pressurized tank. When a sprinkler head activates, the gas is initially released from the sprinkler head and the gas pressure drops in the dry pipe system. Once the pressure drops below a threshold, the clapper opens and pressurized water enters the pipe. The water will flow toward the sprinkler head continuing to push out gas and supplant it with water until the water itself reaches the sprinkler head and begins to be sprayed on the fire.

As should be apparent, when a dry pipe sprinkler system is taken off-line for any reason, new gas must be supplied to pressurize the pipe when the system is reinitiated. The pressure at which the gas is placed in the sprinkler system is called "supervisory pressure" in the art. The most common way to supply the supervisory gas pressure in a dry pipe system is using an air compressor. The air compressor will generally be connected to an air maintenance device to regulate pressure inside the sprinkler system or may be directly connected to the sprinkler system in alternative arrangements. Per regulations (specifically National Fire Protection Association (NFPA) 13) it is necessary to fill a sprinkler system to the appropriate supervisory pressure within 30 minutes when the system is reactivated. Thus, air compressors must be sized for system to fill them within the necessary time frame.

Dry and pre-action fire sprinkler systems will also invariably leak gas over time. For this reason, a source of maintenance gas to maintain the pressure needs to be present. Leaks develop in the sprinkler system from holes created due to corrosion, gaskets leaking, building settlings and many other reasons. NFPA 13 allows that a new sprinkler system is allowed to leak 1.5 PSI per 24 hours. An existing system can leak at 3 psi per 2 hours per NFPA 25. The same air compressor has typically been used as the refill system and may supply air directly when called for due to a decrease in gas pressure, or may supply a tank which has pressurized air which can readily be supplied to the sprinkler system to quickly refill any lost gas.

While fire requirements specify the maximum allowed leak rates, it should be apparent that actual leak rates vary from system to system. Increases in leak rates can cause additional wear and tear on systems that provide maintenance or make-up air. In some cases, increased leaks can require greater volumetric draw than the air compressor can handle. If this happens, the pressure in the sprinkler system can drop and cause low pressure alarms, and in some cases false activations.

Thus, to fill and maintain a dry pipe sprinkler system it is essentially required that gas be provided initially, and that make-up gas be provided on a regular, and often near constant basis. As the air used by an air compressor has traditionally been atmospheric air, it invariably includes water vapor which then becomes trapped in the pipe. Further, the amount of water in the piping can increase over time as more and more new air is added. Atmospheric air also includes oxygen. Thus, the stage is set for additional corrosion to occur within dry pipe systems when they have been filled with atmospheric air.

In order to try and reduce or eliminate the presence of water and oxygen within the piping, some dry pipe fire sprinkler systems now utilize nitrogen as the gas of choice to eliminate one or both of the water vapor and oxygen in the piping, or at least reduce the amounts present to reduce corrosion. To insure the supply, nitrogen is invariably provided from nitrogen generators.

Nitrogen generators are already being used in the fire sprinkler industry to supply supervisory nitrogen gas (usually 98% purity or greater) to dry, and pre-action fire sprinkler systems. Nitrogen, as an inert gas, is used to control corrosion inside these systems as it does not provide for the necessary oxygen for corrosion to occur and the nitrogen generation process also generally results in water vapor being dramatically reduced or eliminated compared to air. Nitrogen generators of the type used in the fire protection industry operate by separating oxygen from nitrogen in atmospheric air. This can be done in a variety of different ways, the most common being via hollow fiber membranes or Pressure Swing Adsorption (PSA). Generators of these types are preferred as they can utilize atmospheric air as their source material, which is essentially unlimited, allowing them to operate continuously.

In generating the nitrogen, there is a significant decrease in volumetric output when compared to the air provided by an air compressor of equivalent size since the nitrogen generator is only providing a portion of the atmospheric air into the sprinkler system (materials other than nitrogen having been removed). Thus, if a nitrogen generator is used to provide the initial supervisory gas, it needs to be able to fill the sprinkler system in 30 minutes per the NFPA 13 requirement. The loss of output from an air compressor when utilizing it to feed a nitrogen generation system means that in order to meet the NFPA 13 requirements, most nitrogen generators are too large and cost prohibitive to make sense.

The most common way in the industry to meet the requirements of NFPA 13 while providing for supervisory gas that has an increased nitrogen percentage is to manually bypass the nitrogen generating components of a nitrogen generator and initially fill the system with air (effectively just using the air compressor from the nitrogen generation system alone in this mode of operation). The flow of the air from the air compressor is diverted manually with ball valves. Once the system has reached the desired supervisory set point, the unit is then manually returned to generating nitrogen and the air compressor feeds the air to the nitrogen generating components for maintaining the pressure in the sprinkler system.

Because there is still residual air in the sprinkler system from the initial fill, the fire sprinkler system needs to remove the oxygen and replace it with nitrogen. This is called the "purge process" or simply "purging." During the purging, air is allowed to escape the fire sprinkler system at a low rate and without depressurizing the system which would trigger it, while it is replaced with higher purity nitrogen coming from the nitrogen generator. Once the internal space in the piping of the fire sprinkler system reaches the desired nitrogen purity, the purge process is stopped (gas is no longer purposefully allowed to escape) and the nitrogen generator will operate to simply maintain the gas pressure in the piping.

Purging can take a substantial amount of time depending on the desired purity and the volume of the system. Further, because the nitrogen generator has a decreased volumetric output, the process can be hard on the machinery and present some dangers of system depressurization while it is occurring.

SUMMARY

Because of these and other problems in the art, there is described herein a gas supply system which includes nitrogen generation. The gas supply system is designed for use with fire sprinkler systems and includes a control system which uses the volumetric flow demand to automatically determine the mode of operation and switch between providing air and nitrogen. The gas supply system can operate either in standard nitrogen generation mode where nitrogen is supplied to the reservoir tank and/or sprinkler system or in a bypass mode, where sufficient pressure is only obtained by directly supplying air. The gas supply system can provide for improved safety in operation as well as the ability to operate the sprinkler system primarily when filled with nitrogen supervisory gas.

There is described herein, among other things, a fill system for automatically supplying nitrogen and air to a sprinkler system, the fill system comprising; a reservoir tank wherein gas in the reservoir tank is provided to a sprinkler system when a pressure in the sprinkler system is below a predetermined threshold; a separation system for obtaining nitrogen from atmospheric air and supplying the nitrogen to the reservoir tank; a compressor, for supplying atmospheric air; a bypass valve, the bypass valve directing air from the compressor alternatively to the separation system or either directly to the reservoir tank or directly to the sprinkler system; a sensor for detecting a gas pressure in the reservoir tank and/or the sprinkler system over time; and a controller; wherein the controller automatically configures the bypass valve to direct air to the separation system when the sensor detects a gas pressure change over time below a rate at which the separation system can supply nitrogen to the reservoir tank; and wherein the controller automatically configures the bypass valve to direct air directly to the reservoir tank and/or the sprinkler system when the sensor detects a gas pressure change over time above the rate at which the separation system can supply nitrogen to the reservoir tank.

In an embodiment of the systems and methods, the separation system includes a hollow fiber membrane.

In an embodiment of the systems and methods, the controller comprises a computer running software.

In an embodiment of the systems and methods, the controller comprises a mechanical circuit board.

In an embodiment, the system and methods further comprise a purge valve which may be on the sprinkler system separated from the reservoir tank or on the reservoir tank.

In an embodiment of the systems and methods, the sprinkler system is a dry pipe system.

In an embodiment of the systems and methods, the sprinkler system is a wet pipe system.

There is also described herein a fill system for automatically supplying nitrogen and air to a fire sprinkler system without a reservoir tank. In this embodiment, the fill system comprises: a separation system for obtaining nitrogen from atmospheric air and supplying said nitrogen to said sprinkler system; a compressor, for supplying atmospheric air; a bypass valve, said bypass valve directing air from said compressor alternatively to said separation system and directly to said sprinkler system; a sensor for detecting a gas pressure in said sprinkler system over time; and a controller; wherein said controller automatically configures said bypass valve to direct air to said separation system when said sensor detects a gas pressure change over time below a rate at which said separation system can supply nitrogen to said sprinkler system; and wherein said controller automatically configures said bypass valve to direct air directly to said sprinkler system when said sensor detects a gas pressure change over time above said rate at which said separation system can supply nitrogen to said sprinkler system.

DESCRIPTION OF PREFERRED EMBODIMENT(S)

Figure 1:
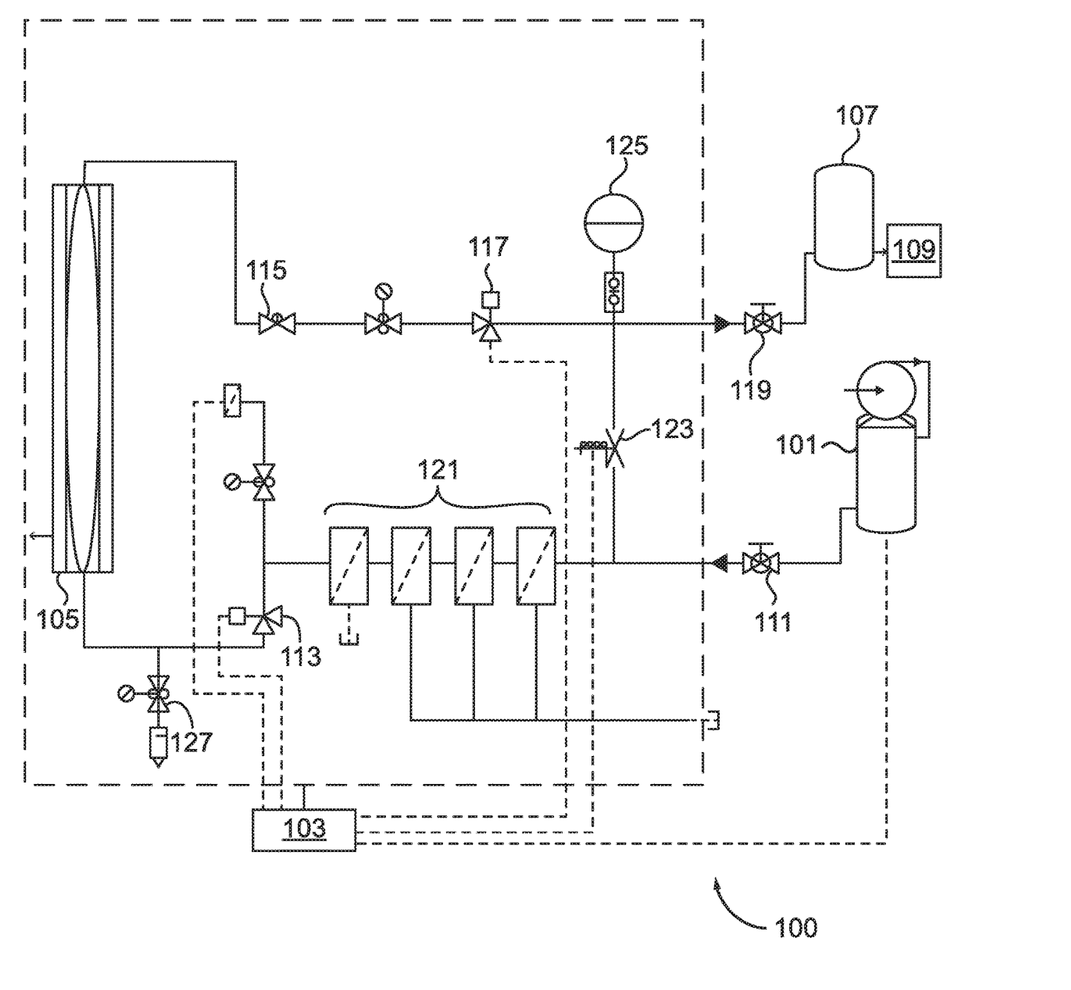
FIG. 1 provides a general block diagram of an automatic nitrogen fill system.

It will be readily understood that the components of the present invention, as generally described and illustrated in the FIGURES herein, could be arranged and designed in a wide variety of different configurations, thus, the following more detailed description of the embodiments of a system as represented in FIG. 1 is not intended to limit the scope of the invention, as claimed, but is merely representative of a presently preferred embodiment.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, hand-held computers, smart phones, tablet computers, mobile devices, server farms, hardware appliances, minicomputers, mainframe computers, video game consoles, handheld video game products, and wearable computing devices including but not limited to eyewear, wrist-wear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, may refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software may be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth™ and other wireless communication devices, virtual memory, storage devices and associated controllers, firmware, and device drivers. The systems and methods described here are contemplated to use computers and computer software typically stored in a computer- or machine-readable storage medium or memory.

FIG. 1 provides for a general block diagram showing the automated operation of a gas supply system for automatic nitrogen fill (100). The system (100) will generally operate in two modes. The first is "bypass mode" which is defined by having the valve settings required to flow around the nitrogen generating components being implemented. In bypass mode, the system (100) is simply acting as a conduit for the air compressor (101). In "nitrogen generating mode" the valve settings required to flow through the nitrogen generating components are implemented. Thus, in nitrogen generating mode, the output of the air compressor (101) will be sent through a nitrogen generator (e.g. membrane (105)) that will substantially strip materials other than nitrogen from the air resulting in a highly pure nitrogen stream output.

The modes are set by the positions of valves (111), (113), (115), (117), (119), and (123) under the control of an electronic controller (103), such as a computer with appropriate software, a hardware control board, or a mechanical control system. The valves (111), (113), (115), (117), (119), and (123) will typically be either solenoid or pneumatic valves with appropriate connections to electric, air, or other activation sources. The positions of the valves (111), (113), (115), (117), (119), and (123) are generally monitored and altered by the controller (103) through the use of appropriate sensors and control hardware. Further, the controller (103) may also have attached thereto additional sensors to provide feedback about the gas being provided to the sprinkler system (109). In particular, the controller (103) may obtain measurements about the pressure of the gas within the sprinkler system (109), the volume and type of gas in the sprinkler system (109), the current discharge rate into the sprinkler system (109), and/or the currently set bleed rate for a purge.

In the embodiment of FIG. 1, the system (100) will generally operate as follows. There is provided an air compressor (101) which is controlled by the controller (103). The air compressor (101) may include an internal tank which provides for a pressurized source, or may supply air to the gas system (100) directly. The controller (103) may be a computer or other digital system running appropriate software to monitor and operate the various components of the gas system (100), air compressor (101), and reservoir tank (107) to sprinkler system (109), or may be a mechanical system. The system (100) includes a nitrogen generation system of some form along with a bypass connection (123). In the embodiment of FIG. 1, the nitrogen generation system is a separation membrane (105) and filters (121). However, in alternative embodiments different nitrogen generation systems including Pressure Swing Absorption (PSA) and cryogenic separators may be used.

The gas system (100) also includes valves for directing air or nitrogen into a reservoir tank (107). The reservoir tank (107) will generally be filled with gas and attached to the sprinkler system (109). The reservoir tank (107) will generally be able to supply gas to the sprinkler system (109) upon detection by the controller (103) that gas is required. This is generally because the pressure in the sprinkler system (109) has fallen by a certain amount. In an embodiment, the supply from the reservoir tank (107) to the sprinkler system (109) may be essentially continuous where the pressure in the reservoir tank (107) is higher than the pressure in the sprinkler system (109) and any air lost in the sprinkler system (109) is immediately replaced, or the reservoir tank (107) may provide gas to the sprinkler system (109) at intervals or upon detection by the controller (103) of the pressure in the sprinkler system (109) having been reduced to a particular trigger point.

While the inclusion of a reservoir tank (107) is generally preferred, it will be understood that in alternative embodiments, the reservoir tank (107) may be removed and the gas system (100) can provide fill air and/or nitrogen directly to the sprinkler system (109) upon generation. In such an embodiment, the reservoir tank (107) would be eliminated from the system as shown in FIG. 1, and the piping would connect to the sprinkler directly. In this type of embodiment, the sensor (125) will also generally be positioned in the sprinkler system (109). In such an embodiment without a reservoir tank (107) the sprinkler system (109) or a portion thereof may actually behave as the reservoir tank (107) does in the embodiment of FIG. 1. In a still further embodiment, the pressure in the sprinkler system may be measured directly. In a still further embodiment, the reservoir tank (107) and the sprinkler system (109) may be maintained at the same pressure. In this way, the pressure in the reservoir tank (107) may be measured and this can be used to determine the pressure in the sprinkler system (109) and be used to determine when to activate the air compressor (101).

The valves in the gas system (100) will generally be arranged to provide for two pathways from the air compressor (101) to the tank (107). In the first pathway which provides nitrogen generation mode, the air from the air compressor (101) is supplied to the membrane (105) and nitrogen is supplied to the tank (107) while in the second pathway which provides bypass mode, the air from the air compressor (101) bypasses the membrane (105) and air is directly supplied to the tank (107).

In nitrogen generating mode, the reservoir tank (107) will generally be filled, over time, with nitrogen by compressing air at compressor (101) and sending it through valves (111) and (113) to the membrane (105). The air will generally be filtered by filters (121) to eliminate particulates, water, and other elements that are undesirable prior to reaching the membrane (105). At the membrane (105), nitrogen is stripped from the air and the nitrogen is allowed to pass through valves (115), (117) and (119) to enter the tank (107). The stripped gases are generally discharged back to the atmosphere by the release valve (127). The reservoir tank (107) is preferably set to a pressure higher than the supervisory pressure of the sprinkler system (109) but this is not required.

In an exemplary embodiment, the sprinkler system (109) will be provided with a supervisory pressure of about 40 PSIG and the tank (107) with a pressure of about 60-80 PSIG. This is done merely for illustrative example and is used throughout this disclosure to illustrate a particular operation. One of ordinary skill in the art would understand that the supervisory pressure can be any value and will commonly be between about 10 psi to about 60 psi. Similarly, tank (107) pressures can also be any value and will commonly range from about 50 psi to about 175 psi. Further, as contemplated above, in an alternative embodiment, the pressure in the reservoir tank (107) and the sprinkler system (109) may be the same allowing the pressure in the reservoir tank (107) to act as an indicator of the pressure in the sprinkler system (109) and this pressure could be any value appropriate for the sprinkler system (109) and reservoir tank (107) in combination.

In the embodiment of FIG. 1, when the sprinkler system (109) is empty and is being recharged, gas will be provided to the sprinkler system (109) from the reservoir tank (107). As the reservoir tank (107) will often begin the process full of nitrogen (as it can remain pressurized while the sprinkler system (109) is discharged), it will often serve to pump nitrogen into the sprinkler system (109) initially. In an embodiment, once the nitrogen has begun to enter the sprinkler system (109) the pressure in the tank (107) will begin to fall. This pressure decrease can be detected by a sensor and the air compressor (101) may be actuated to provide more gas to the reservoir tank (107). In an embodiment, the air from the compressor (101) will go through the membrane (105) so that the air provided is nitrogen. Alternatively, the bypass valve (123) may be opened and air fed directly to the tank (107).

Generally during an initial fill, the bypass valve (123) will be opened and air will be allowed to flow through the tank (107) and into the sprinkler system (109) in bypass mode. As the air compressor (101) will commonly be able to provide a much higher volume of air directly than comes from the membrane (105), the sprinkler system (109) will generally rapidly fill and meet NFPA requirements with a smaller compressor (101) than would be necessary if the system was to be initially filled with nitrogen. Further, the sprinkler system (109) may also be tested for integrity at this time as it is now under operating pressure.

Once the fire sprinkler system (109) is initially filled with gas, purge valves in the sprinkler system (109) may be opened. As the flow of gas from the purge valve will generally be selected to be less than the flow which can be generated from the nitrogen membrane (105), the bypass valve (123) will be closed, and nitrogen will be supplied from the membrane to the tank (107) and to the sprinkler system (109). This will result in the non-nitrogen components of the gas in the reservoir tank (107) and sprinkler system (109) becoming increasingly diluted over time as highly pure nitrogen is supplied to the reservoir tank (107) and sprinkler system (109).

Once the sprinkler system (109) has been determined to be sufficiently high in nitrogen concentration, the purge valve will be closed, and the connection from the reservoir tank (107) to the sprinkler system (109) will only supply makeup gas as necessary. During this time, the reservoir tank (107) may be filled to its set point (generally around 80 psi, but this is not required) at which point the air compressor (101) is shut off.

Assuming there are no leaks in the system (109), the reservoir tank (107) should remain at this pressure without further action indefinitely. However, generally there will be a small amount of gas leakage within the sprinkler system (109). When this is detected due to a reduction in pressure in the sprinkler system (109) (which may be via the controller (103) or simple pressure differential between the reservoir tank (107) and the sprinkler system (109) such as through a specific pressure valve calibrated for the purpose), the reservoir tank (107) will generally provide fill gas to return the sprinkler system (109) to pressure. As gas flows from the reservoir tank (107), the reservoir tank (107) pressure decreases. Generally, when the reservoir tank (107) hits a particular target pressure, often around 60 PSIG, the controller (103) will determine that the reservoir tank (107) needs to be refilled and the controller (103) will trigger the air compressor (101) to operate. The controller (103) will generally arrange the automatic nitrogen fill system (100) in nitrogen generation mode to feed air to the membrane (105) and supply nitrogen to the reservoir tank (107). The generated nitrogen will be fed to the tank (107) until the pressure in the reservoir tank (107) is restored to its target holding pressure.

The system (100) will generally operate in the above maintenance mode indefinitely so long as there are no leaks in the sprinkler system (109) or anywhere else in the gas path that are large enough to allow more gas to escape than can be generated by normal operation of the air compressor (101) through the nitrogen membrane (105). However, if a large leak develops, the controller (103) will automatically change the automatic nitrogen fill system (100) to bypass mode to keep the sprinkler system (109) pressurized until maintenance work can be done.

In the event of a large leak, the reservoir tank (107) will generally operate in the same way that it would for a small leak. In order to respond to a large leak, however, first the controller (103) needs to determine that a large leak is occurring. In the first instance, the controller (103) can calculate how much time it takes for the pressure drop in the reservoir tank (107) to reach the point that the refilling activity is activated. In the event that this is quicker than a certain threshold, a large leak can be determined to exist by the controller (103). In an alternative embodiment, the pressure decrease can be calculated before the reservoir tank (107) has been depleted to its refill threshold. This can be done by providing a pressure sensor (125) which continuously monitors the pressure in the reservoir tank (107). The controller (103) can then determine the rate of drop of the pressure over time by simply calculating the drop between sensor output indications from the sensor (125). As the sensor (125) will often report back at known fixed intervals, the rate can be determined for any of these intervals regardless of the current pressure in the reservoir tank (107).

In the event that a large leak is detected by the controller (103), the concern is that the reservoir tank (107) will eventually drop to pressure below the supervisory pressure of the sprinkler system (109) (e.g. 40 PSIG) and the system (100) will be unable to maintain the pressure in the sprinkler system (109) as gas will now want to flow from the sprinkler system (109) into the reservoir tank (107). This is a dangerous situation and the sprinkler system (109) would need to be under maintenance before it occurred.

In the present disclosure, a large leak is generally defined as any leak where the amount of gas leaking from the system (109) is greater than the amount of nitrogen that can be put into the reservoir tank (107) via the membrane (105) in the same amount of time. However, it should be recognized that a leak which is not yet a large leak could be detected and determined to present a sufficiently large problem that it needs to be treated as large leak, even if it is not sufficiently large yet to present an immediate concern.

In a large leak, the nitrogen membrane (105) is unable to keep up with the demand for nitrogen from the reservoir tank (107) to the sprinkler system (109) and a danger situation exists. Specifically, the pressure in the reservoir tank (107) will slowly fall from the current level when the leak was detected, to the point where the pressure in the reservoir tank (107) falls below the pressure that needs to be maintained in the sprinkler system (109). This will generally not occur instantaneously, or even particularly quickly, as the reservoir tank (107) has available extra gas at the time of the leak detection, but it does present a concern.

The present automatic nitrogen fill system (100) provides for additional protection in this situation. Specifically, upon detection of a large leak, the controller (103) will automatically convert the system (100) to bypass mode to protect the pressure in the sprinkler system (109). In particular, opening the bypass valve (123) and closing valve (113) allows air from the compressor (101) to "bypass" the membrane (105) and go straight to the reservoir tank (107). This will generally allow for a greater flow of gas into the reservoir tank (103) as the air compressor (101) will provide a greater flow of air to the membrane (105) than is provided from the membrane (105). For example, it is commonly the case that the bypass supplying air to the tank (107) can supply more than 3× the gas volume to the tank (107) as can be supplied from the membrane (105) in the same amount of time. Thus, when the bypass valve (123) opens, it is hopefully the case that the large leak detected is not large enough to outpace the air flow through the bypass valve (123). In this way, pressure can still be maintained in the sprinkler system (109) indefinitely. This allows for a much greater window of time before the sprinkler system (109) could potentially falsely activate.

The operation of switching from nitrogen generation mode to bypass mode can be further illustrated by example. In an embodiment, the air compressor (101) will be able to push 5 standard cubic feet of air per minute (5 scfm) of flow into the system (100). Should the air be provided to the membrane (105), this will allow for 1 scfm of nitrogen to flow into the reservoir tank (107). At the start of this example, the sprinkler system (109) has just been placed in operation and is empty (it has no pressure or 0 PSIG). Generally, the reservoir tank (107) will be full, but it may be empty (or at least below its low cutoff). Regardless, as gas starts to flow from the reservoir tank (107) to the sprinkler system (109) the controller (103) will be able to rapidly determine that the flow is above that of a large leak. This is not because the sprinkler system (109) is actually leaking, but because there is no pressure in the sprinkler system (109). The controller (103) will, therefore, automatically open the bypass valve (123) to the reservoir tank (107) since the sprinkler system (109) being initially filled has a demand that exceeds 1 scfm of flow.

Eventually, the sprinkler system (109) will fill to 40 PSIG which is its supervisory pressure. At that time, the sprinkler system (109) will cease needing any more gas and the flow rate from the reservoir tank (107) will dramatically decrease and go below the 1 scfm threshold for nitrogen generation. At this time, the controller (103) will automatically close the bypass (123) and open the nitrogen membrane (105) to allow the tank (107) to begin to be filled with nitrogen. It should be recognized that the reservoir tank (107) at this time may include a mixture of generated nitrogen and bypass air and, therefore, the supplied gas to the sprinkler system (109) will generally be a mixture with higher nitrogen content than atmospheric air, but not being nitrogen gas of the purity produced by the membrane (105).

To purge the sprinkler system (109) of air, once the reservoir tank (107) is sufficiently filled, a purge valve in the sprinkler system (109) will be opened. This may be done automatically by controller (103) or may be done manually. Purging will result in a small leak (e.g. less than 1 scfm) from the sprinkler system (109). The tank (107) will supply gas to the sprinkler system (109) while additional nitrogen is supplied to the tank (107) from the membrane (105). This may be via a generally continuous operation, but will commonly be by having the tank (107) fill to its maximum pressure (often around 80 PSIG) when the air compressor (101) will be shut off. The reservoir tank (107) will again supply gas comprising an increased percentage of nitrogen to the sprinkler system (109) until the pressure drops to the cutoff pressure (usually 60 PSIG), at which point the air compressor (101) will reactivate until the pressure in the reservoir tank (107) is returned to 80 PSIG. This process will be repeated until the air in the sprinkler system (109) has been sufficiently purged. At that time, the purge valve will be closed and the tank (107) will not supply further gas to the sprinkler system (109) until it is needed by the sprinkler system (109). Generally by this time the reservoir tank (107) will also be filled with gas that is a much higher percentage of nitrogen than at the time the purge commenced. The reservoir tank (107) may be filled with essentially pure nitrogen depending on embodiment and relative sizes between the volume of the sprinkler system (109) and the reservoir tank (107). Ending the purge may occur automatically by action of the controller (103) or may be a manual process.

It should be recognized that so long as the reservoir tank (107) is being supplied only with nitrogen from the membrane (105) in the purge operation, the gas in the reservoir tank (107) will get closer during each fill to being "pure" nitrogen. Similarly, as the reservoir tank (107) provides this increasingly pure nitrogen to the sprinkler system (109), the gas in the sprinkler system (109) will also begin to approach "pure" nitrogen. The percentage of nitrogen in both the reservoir tank (107) and/or sprinkler system (109) can be monitored to determine when the gas is sufficiently "pure" nitrogen to consider the sprinkler system (109) purged.

Should the sprinkler system (109) later develop a small leak (for example of 0.5 scfm), the reservoir tank (107) will supply gas (which will generally be "pure" nitrogen as that's what the reservoir tank (107) contained at the time it was last filled) to the sprinkler system (109) to maintain the pressure in the sprinkler system (109) at essentially 40 PSIG. When the tank (107) pressure drops below 60 PSIG from this small leak, the controller (103) will reactivate the air compressor (101) to supply air to the membrane (105) and nitrogen to the reservoir tank (107) at the rate of 1 scfm as discussed above. In this way, the equilibrium pressure of 40 PSIG in the sprinkler system (109) is maintained and the reservoir tank (107) is filled even while the sprinkler system (109) is leaking.

Should a large leak develop in the sprinkler system (109), this will result in a loss of more than 1 scfm of gas from the sprinkler system (109). In this case, the controller (103) will determine that the leak is large from the speed at which the reservoir tank (107) is losing pressure. Once this situation is detected, the controller (103) will automatically switch the automatic nitrogen fill system (100) to bypass mode by opening the bypass valve (123) and closing the membrane valve (113). In bypass mode, air is supplied at 5 scfm directly from the air compressor (101) to the reservoir tank (107). This allows for the sprinkler system (109) to remain pressurized indefinitely so long as the large leak is below 5 scfm because the reservoir tank (107) can pressurize with the air. If a very large leak occurred (one above 5 scfm) it would also allow the reservoir tank to attempt to maintain the pressure in the sprinkler system (109) above 40 PSIG for as long as possible. It should also be recognized that a very large leak may actually be activation of the fire sprinkler system (109), and thus this situation may be treated simply as an activation of the sprinkler system (109).

The nitrogen fill system (100) can supply air through the bypass valve (123) to the sprinkler system (109) in a variety of different ways. In the embodiment of the FIG. the bypass air is supplied through the reservoir tank (107) to the sprinkler system (109). This means that in bypass mode, new bypass air and remaining nitrogen in the tank (107) will be mixing decreasing the purity of the nitrogen in the reservoir tank (107) and the sprinkler system (109). However, this is generally acceptable as should there be a large leak, maintenance, and likely draining of the entire sprinkler system (109), will often be required. Once the leak is repaired, it may, therefore, be necessary to purge the reservoir tank (107) to eliminate stored air.

In an alternative embodiment, the bypass valve (123) will have the air bypass the tank (107) and go straight to the sprinkler system (109). While this keeps the nitrogen in the tank (107) "pure", it may result in a problem in detecting a need to supply gas to the sprinkler system (109) as the tank (107) may no longer be providing gas to the sprinkler system (109) and the rate of such provision (which is commonly dependent on the rate the tank (107) discharges) may not be readily determinable. This is therefore generally not preferred.

As should be apparent, should a large leak be detected, the controller (103) will generally also trigger an alarm or other notification indicating that it has switched to bypass operation and maintenance is required. This allows for those responsible for the system to become aware of the presence of a large leak and react accordingly. Further, because the size of the leak (e.g. its flow rate) will generally have been determined as part of the controller's decision to open the bypass (123), that leak rate can be provided to the users as well. From that, they can determine the urgency of a need to repair, or if this is not a leak at all but a system activation. Generally, the urgency will not be extreme as leak rates usually increase slowly over time, thus the large leak will often not be substantially over the threshold of size, and the pressure in the reservoir tank (107) can be readily maintained by the air compressor (101) in bypass mode.

In an embodiment of FIG. 1, there is no need to monitor the actual pressure in the sprinkler system (109) as the automatic nitrogen fill system (100) will essentially operate in a dumb mode with the reservoir tank (107) simply supplying pressure in a manner to keep the pressure in the sprinkler system (109) at the maintenance pressure. That is, the automatic nitrogen fill system (100) does not need to know the pressure in the sprinkler system to react to a pressure drop in the sprinkler system (109) because it can react based on a pressure drop in the reservoir tank (107) from the reservoir tank automatically discharging to the sprinkler system (109) when the pressure in the sprinkler system (109) decreases.

However, in an alternative embodiment, the controller (103) can also monitor the pressure in the sprinkler system (109) directly. This can provide for more direct measurement of the rate of any leak as well as providing a quicker reaction to supply gas from the reservoir tank (107) and to switch to bypass mode. Specifically, there is no need for the pressure in the system (109) to fall below a set point before gas is provided from the reservoir tank (107) if the pressure in the sprinkler system (109) is monitored directly. Instead, the appropriate fill gas may be provided to the reservoir tank (107) as part of a direct feedback loop continuously or at very small time intervals.

Further, while the above contemplates that the determination of whether to provide nitrogen or air to the reservoir tank (107) and/or sprinkler system (109) based on a determination of how quickly the pressure decreases from the supervisory pressure, it should be recognized that this is not required and alternative methodologies may be used. In an alternative embodiment, the gas system (100) controller (103) may make the determination based on the detected nitrogen purity in the sprinkler system (109) and/or reservoir tank (107). For example should the controller (103) determine that the nitrogen purity is below 98% and the pressure is below supervisory, fill air will be used, where if the pressure is at supervisory and purity is still low, the nitrogen generation path will be used.

The above discussion contemplates the use of a purge valve or purging system when the sprinkler system (109) is being refilled. Use of a purge vale is often preferred as it allows for a greater purity of nitrogen to be provided and maintained in the sprinkler system (109) essentially from the refill action. However, this is not always desirable or necessary. In an alternative embodiment, the system (100) may be used without a purge valve in a variety of configurations. In the first instance, the operation is simply to fill the sprinkler system (109) and reservoir tank (107) with air using bypass valve (123). Once the sprinkler system (109) is sufficiently filled, the bypass valve (123) may be closed and the reservoir tank (107) may be filled with nitrogen (at least to the extent it still requires additional fill). The air in the sprinkler system (109) is then simply allowed to dissipate through inherent small leaks in the system. Every time the reservoir tank (107) provides fill gas, the purity of the nitrogen in the sprinkler system will increase. This type of operation may be desirable for older systems which may have more inherent small leaks as they may require more makeup gas over time and the need to purge may not be as urgent.

This is, however, not the only way that the system (100) may be operated without a purge valve being present. In another embodiment, the reservoir tank (107) may be filed with nitrogen upon commencement of refilling the system. The bypass valve (123) may be opened and air may be supplied to the sprinkler system (109) through the reservoir tank (107). This will result in an air/nitrogen blend being provided to the sprinkler system (109) as contemplated previously. The blend will slowly turn into pure air as the nitrogen is pushed from the reservoir tank (107). However, instead of filling the sprinkler system to supervisory pressure using the air, the controller (103) may monitor the pressure inside the reservoir tank (107) and/or sprinkler system (109) and calculate when a switch to nitrogen may occur.

In this situation, when the reservoir tank (107)/sprinkler system (109) reaches a pressure whereby the supervisory pressure can be obtained in any necessary time window using nitrogen generation, the controller (103) will switch the bypass valve (123) to closed and begin using the nitrogen generating mode to finish filing the system (100) to supervisory pressure, and then to fill the reservoir tank (107) to its desired pressure (if different). This type of operation will result in the sprinkler system (109) having more nitrogen originally present than if the bypass mode is used until supervisory pressure is reached as the controller (103) essentially uses the most nitrogen it can to get the sprinkler system (109) to supervisory pressure within the required time window.

In a still further embodiment, purging may be eliminated from the sprinkler system (109) but a purge valve may be used in conjunction with the reservoir tank (107). In this embodiment, a purge valve is provided which will allow for purging of the reservoir tank (107) without gas being provided from the tank (107) to the sprinkler system (109). This can be desirable to increase the nitrogen purity of the gas inside the tank (107) without having to alter the gas inside the sprinkler system (109) in any way. Thus, it can be possible to completely fill the reservoir tank (107) and sprinkler system (109) with air, and then purge just the reservoir tank (107) by replacing the air with "pure" nitrogen so that essentially pure nitrogen is available upon an initial need to supply fill gas to the sprinkler system (109). Thus, should the sprinkler system (109) not be purged but simply allowed to leak over time, the refill gas from the start would essentially be pure nitrogen.

Similar to purging the reservoir tank (107) the bypass (123) may also bypass the reservoir tank (107) to protect the purity of nitrogen in the reservoir tank (107). As discussed above, in an embodiment, the bypass (123) may supply air directly to the sprinkler system (109) and not through the reservoir tank (107). In this case, the gas in the reservoir tank (107) may remain essentially pure nitrogen even during a draining and refilling operation. After completion of the gas refilling operation, the nitrogen in the tank (107) may be allowed to intermix with the air in the sprinkler system (109) increasing the resultant purity in the sprinkler system (109) while decreasing it in the reservoir tank (107).

The above presents a still further mode of operation which would allow for purging of the sprinkler system (109) without the use of a purge valve in the sprinkler system (109), but with one in the reservoir tank (107). In this embodiment, the reservoir tank (107) includes a purge valve and the sprinkler system (109) does not. The sprinkler system (109) and reservoir tank (107) are both brought up to supervisory pressure using bypass air, at which time the bypass (123) is switch and nitrogen from the membrane (105) is supplied to the reservoir tank (107) while the purge vale in the reservoir tank (107) is opened. As both the reservoir tank (107) and sprinkler system (109) are at the same pressure, the nitrogen will generally migrate from the reservoir tank (107) to the sprinkler system (109) to seek equilibrium. Further, as nitrogen will continuously be supplied to the tank (107) air will continue to be displaced. This arrangement can be particularly useful when the reservoir tank (107) and associated purge are positioned relative the sprinkler system (109) to account for the different mass of nitrogen compared to oxygen to enhance oxygen purging.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A fill system for automatically supplying nitrogen and air to a fire sprinkler system, the fill system comprising;
   a reservoir tank. wherein gas in said reservoir tank is provided to a sprinkler system when a pressure in said sprinkler system is below a predetermined threshold until said pressure in said sprinkler system is returned above a sprinkler system supervisory pressure when said reservoir tank ceases providing gas to said sprinkler system;
   a separation system for obtaining nitrogen from atmospheric air and supplying said nitrogen to said reservoir tank;
   a compressor, for supplying atmospheric air;
   a bypass valve, said bypass valve directing air from said compressor alternatively to said separation system and directly to said reservoir tank;
   a sensor for detecting a gas pressure in said reservoir tank over time; and
   a controller supplying gas to said reservoir tank when said gas pressure in said reservoir tank drops below a target pressure until said pressure in said reservoir tank is above a set point pressure by activating said compressor and;
      configuring said bypass valve to direct air to said separation system when said sensor detects a gas pressure change over time below a rate at which said separation system can supply nitrogen to said reservoir tank; or
      configuring said bypass valve to direct air directly to said reservoir tank when said sensor detects a gas pressure change over time above said rate at which said separation system can supply nitrogen to said reservoir tank;
   wherein said target pressure of said reservoir tank is above said sprinkler system supervisory pressure; and
   wherein said controller supplies gas to said reservoir tank when said sprinkler system is above said sprinkler system supervisory pressure and said reservoir tank is below said set point pressure.

2. The fill system of claim I wherein said separation system includes a hollow fiber membrane.

3. The fill system of claim 1 wherein said controller comprises a computer running software.

4. The fill system of claim I wherein said controller comprises a mechanical circuit board.

5. The fill system of claim 1 further comprising a purge valve.

6. The fill system of claim 5 wherein said purge valve is on said sprinkler system separated from said reservoir tank.

7. The fill system of claim 5 wherein said purge valve is on said reservoir tank.

8. The fill system of claim I wherein said sprinkler system is a dry pipe system.

9. (The fill system of claim I wherein said sprinkler system is a wet pipe system.

10. A fill system for automatically supplying nitrogen and air to a tire sprinkler system; the fill system comprising;
    a reservoir tank wherein gas in said reservoir tank is provided to a sprinkler system when a pressure in said sprinkler system is below a predetermined threshold until said pressure in said sprinkler system is returned above a sprinkler system supervisory pressure when said reservoir tank ceases providing gas to said sprinkler system;
    a separation system for obtaining nitrogen from atmospheric air and supplying said nitrogen to said reservoir tank;
    a compressor, for supplying atmospheric air;
    a bypass valve, said bypass valve directing air from said compressor alternatively to said separation system and directly to said sprinkler system;
    a sensor for detecting a gas pressure in said sprinkler system over tune; and
    a controller supplying gas to said reservoir tank when said gas pressure in said reservoir tank drops below a target pressure until said pressure in said reservoir tank is above a set point pressure by activating said compressor and:
       configuring said bypass valve to direct air to said separation system when said Sensor detects a gas pressure change over time below a rate at which said separation system can supply nitrogen to said reservoir tank; or
       configuring said bypass valve to direct air directly to said sprinkler system when said sensor detects a gas pressure change over time above said rate at which said separation system can supply nitrogen to said reservoir tank;
    wherein said target pressure of said reservoir tank is above said sprinkler system supervisory pressure; and
    wherein said controller supplies gas to said reservoir tank when said sprinkler system is above said sprinkler system supervisory pressure and said reservoir tank is below said set point pressure.

11. The fill system of claim 10 wherein said separation system includes a hollow fiber membrane.

12. The fill system of claim 10 wherein said controller comprises a computer running software.

13. The till system of claim 10 ,wherein said controller comprises a mechanical circuit board.

14. The fill system of claim 10 further comprising a purge valve.

15. The fill system of claim 14 wherein said purge valve is on said sprinkler system separated from said reservoir tank.

16. The fill system of claim 14 wherein said purge valve is on said reservoir tank.

17. The fill system of claim 10 wherein said sprinkler system is a dry pipe system.

18. The fill system of claim 10 wherein said sprinkler system is a wet pipe system.

19. The fill system of claim 1 wherein said predetermined threshold and said sprinkler system supervisory pressure are the same pressure.

20. The fill system of claim 1 wherein said target pressure and said set point pressure are the same pressure.

* * * * *

UNITED STATES PATENT AND TRADEMARK OFFICE
CERTIFICATE OF CORRECTION

PATENT NO. : 11,291,871 B2
APPLICATION NO. : 15/884049
DATED : April 5, 2022
INVENTOR(S) : Tihen et al.

It is certified that error appears in the above-identified patent and that said Letters Patent is hereby corrected as shown below:

In the Claims

Column 15, Claim 1, Line 11: "tank." should read -- tank, --.
Column 15, Claim 2, Line 48: "I" should read -- 1 --.
Column 15, Claim 4, Line 53: "I" should read -- 1 --.
Column 15, Claim 8, Line 60: "I" should read -- 1 --.
Column 15, Claim 9, Line 62: "(The" should read -- The --.
Column 15, Claim 9, Line 62: "I" should read -- 1 --.
Column 16, Claim 10, Line 2: "tire" should read -- fire --.
Column 16, Claim 10, Line 18: "tune" should read -- time --.
Column 16, Claim 10, Line 26: "Sensor" should read -- sensor --.
Column 16, Claim 13, Line 45: "till" should read -- fill --.
Column 16, Claim 13, Line 45: "10 ," should read -- 10 --.

Signed and Sealed this
Twelfth Day of July, 2022

Katherine Kelly Vidal
*Director of the United States Patent and Trademark Office*